(12) United States Patent
Maker (10) Patent No.: US 12,075,119 B2
(45) Date of Patent: *Aug. 27, 2024

(54) SPEAKER-IDENTIFICATION MODEL FOR CONTROLLING OPERATION OF A MEDIA PLAYER

(71) Applicant: Roku, Inc., San Jose, CA (US)

(72) Inventor: Frank Maker, Livermore, CA (US)

(73) Assignee: Roku, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/189,701

(22) Filed: Mar. 24, 2023

(65) Prior Publication Data

US 2023/0403430 A1 Dec. 14, 2023

Related U.S. Application Data

(63) Continuation of application No. 17/838,847, filed on Jun. 13, 2022, now Pat. No. 11,641,505.

(51) Int. Cl.
*H04N 21/45* (2011.01)
*H04N 21/422* (2011.01)
*H04N 21/4415* (2011.01)
*H04N 21/472* (2011.01)

(52) U.S. Cl.
CPC ... *H04N 21/4532* (2013.01); *H04N 21/42203* (2013.01); *H04N 21/4415* (2013.01); *H04N 21/47202* (2013.01)

(58) Field of Classification Search
None
See application file for complete search history.

(56) References Cited

U.S. PATENT DOCUMENTS

| 7,783,490 B2 | 8/2010 | Reichardt et al. | |
|---|---|---|---|
| 2002/0198762 A1* | 12/2002 | Donato | H04N 21/44218 725/24 |
| 2005/0172319 A1* | 8/2005 | Reichardt | H04N 21/47 725/86 |

(Continued)

OTHER PUBLICATIONS

Ye et al., "A Deep Neural Network Model for Speaker Identification", Applied Sciences 11, 3603; 18 pages; 2021; https://doi.org/10.3390/app11083603; https://www.mdpi.com/journal/applsci.

(Continued)

*Primary Examiner* — Alexander Q Huerta
(74) *Attorney, Agent, or Firm* — McDonnell Boehnen Hulbert & Berghoff LLP (57) ABSTRACT

In one aspect, an example method includes (i) obtaining, by a media player of a media presentation system, an audio signal, where the audio signal includes a voice command and is obtained using a microphone of the media presentation system; (ii) identifying, by the media player, which of multiple speakers of a household uttered the voice command using the audio signal and a speaker-identification model; (iii) performing, by the media player, an action corresponding to the voice command; and (iv) based on the identifying of the speaker using the audio signal and the speaker-identification model, selecting, by the media player, a user profile associated with the identified speaker within a streaming channel so as to bypass a profile selection screen of the streaming channel.

17 Claims, 6 Drawing Sheets

MEDIA PRESENTATION SYSTEM (56) References Cited

U.S. PATENT DOCUMENTS

| | | | |
|---|---|---|---|
| 2009/0133051 A1* | 5/2009 | Hildreth | H04N 21/42204 |
| | | | 725/28 |
| 2009/0138805 A1 | 5/2009 | Hildreth | |
| 2013/0144915 A1* | 6/2013 | Ravi | G06F 16/437 |
| | | | 707/E17.005 |
| 2013/0312019 A1* | 11/2013 | McMillan | H04N 21/42203 |
| | | | 725/14 |
| 2015/0160685 A1 | 6/2015 | Bartley et al. | |
| 2015/0162006 A1* | 6/2015 | Kummer | H04N 21/41265 |
| | | | 704/275 |
| 2015/0279387 A1 | 10/2015 | List | |
| 2015/0341410 A1 | 11/2015 | Schrempp | |
| 2016/0065902 A1* | 3/2016 | Deng | H04H 60/31 |
| | | | 348/77 |
| 2018/0189076 A1* | 7/2018 | Liston | G06F 9/451 |
| 2018/0213276 A1* | 7/2018 | Pardue | H04N 21/42221 |
| 2020/0037028 A1 | 1/2020 | Boniolo | |
| 2020/0099986 A1* | 3/2020 | Volk | H04N 21/47815 |
| 2020/0145707 A1 | 5/2020 | Smith | |
| 2021/0233542 A1 | 7/2021 | Matthews | |
| 2022/0060784 A1* | 2/2022 | LiVoti | H04N 21/4394 |
| 2022/0167040 A1 | 5/2022 | Richardson | |

OTHER PUBLICATIONS

Selvaraj et al., "Deep Learning for Speaker Recognition", 7 pages.
Selecting user profiles with Roku Voice; 5 pages; https://developer.roku.com/overview; https://developer.roku.com/docs/developer-program/media-playback/voice-controls/voice-profile-selector.md.

* cited by examiner

SPEAKER-IDENTIFICATION MODEL FOR
CONTROLLING OPERATION OF A MEDIA
PLAYER

PRIORITY

This disclosure is a continuation of, and claims priority to, U.S. patent application Ser. No. 17/838,847 filed Jun. 13, 2022, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means the at least one.

SUMMARY

A typical media presentation system operates to facilitate presentation of media content, such as video, audio, or multi-media content, to end users. An example of such a system could include client-side equipment positioned at customer premises and arranged to output and present media content on a user interface such as a display screen with an associated sound system, and server-side equipment arranged to serve media content to the client-side equipment for presentation.

By way of example, the client-side equipment could include a media presentation device such as a television (TV), monitor, tablet computer, or mobile phone, which could present the media content on a user interface. Further, the client-side equipment could include a media player such as an over-the-top (OTT) streaming media player, cable or satellite set top box, digital video recorder, disc player, gaming system, mobile phone, personal computer, audio/video receiver, or tuner, which could be integrated with or in local or network communication with the media presentation device and could output media content to the media presentation device for presentation on the user interface. And the server-side equipment could include a media server and/or head-end equipment, operated by an OTT provider (e.g., virtual multichannel video programming distributor (virtual MVPD)), cable or satellite TV provider, or the like, which could stream or otherwise deliver media content to the client-side equipment for presentation.

In operation, a user at the customer premises may control the client-side equipment, to cause the system to present a desired media-content item, such as a movie, TV show, or video game, among other possibilities, any of which might be locally-stored, broadcast, or on-demand, also among other possibilities. For instance, the media presentation system may present the user with an on-screen media-content selection menu, and the user may operate a remote control to navigate through that menu, to select a desired media-content item, and to direct the system to present the selected media-content item. In response, possibly through interaction between the client-side equipment and the server-side equipment, the client-side equipment could obtain and present the selected media-content item to the user. And the user may then enjoy presentation of that selected media-content item.

In one aspect, an example method is disclosed. The method includes (i) obtaining, by a media player of a media presentation system, an audio signal, where the audio signal includes a voice command and is obtained using a microphone of the media presentation system; (ii) identifying, by the media player, which of multiple speakers of a household uttered the voice command using the audio signal and a speaker-identification model; (iii) performing, by the media player, an action corresponding to the voice command; and (iv) based on the identifying of the speaker using the audio signal and the speaker-identification model, selecting, by the media player, a user profile associated with the identified speaker within a streaming channel so as to bypass a profile selection screen of the streaming channel.

In another aspect, an example media player of a media presentation system is disclosed. The media player is configured for performing a set of acts including (i) obtaining an audio signal, where the audio signal includes a voice command and is obtained using a microphone of the media presentation system; (ii) identifying which of multiple speakers of a household uttered the voice command using the audio signal and a speaker-identification model; (iii) performing an action corresponding to the voice command; and (iv) based on the identifying of the speaker using the audio signal and the speaker-identification model, selecting a user profile associated with the identified speaker within a streaming channel so as to bypass a profile selection screen of the streaming channel.

In another aspect, an example media player of a media presentation system is disclosed. The media player is configured for performing a set of acts including (i) obtaining an audio signal, where the audio signal includes a voice command and is obtained using a microphone of the media presentation system; (ii) identifying which of multiple speakers of a household uttered the voice command using the audio signal and a speaker-identification model; (iii) after obtaining the audio signal, presenting an advertisement; (iv) obtaining metadata for the identified speaker; and (v) based on the identifying of the speaker using the audio signal and the speaker-identification model, generating an advertisement impression record that associates the metadata for the identified speaker with the advertisement.

DETAILED DESCRIPTION

I. Overview

As noted above, some media presentation systems include client-side equipment positioned at customer premises that are arranged to output and present media content on a user interface. At some customer premises, there are multiple users that interact with and control the client-side equipment to cause the media presentation system to present a desired media-content item. With current solutions, a media presentation system can identify which of multiple users are controlling the client-side equipment through use of a profile selection screen.

By way of example, the media presentation system can provide media content on multiple individual streaming channels. A media player of the media presentation system can provide the user with a graphical user interface (GUI) through which the user can select a given streaming channel. Assuming that the streaming channel provides a profile selection screen, the streaming channel can then prompt the user to select a user profile using the GUI. After selecting the user profile, the user may select a desired media-content item. However, not all streaming channels utilize profile selection screens.

Moreover, some media presentation systems include voice capabilities that allow a user to find content on streaming channels, control the media presentation device, and/or start playback of a media-content item. For instance, a remote control of the media presentation system may include a microphone. The user can issue a voice command by pushing a voice button on the remote control and saying a voice command, or by saying a wake word/phrase followed by a voice command. One example of a voice command is a voice search (e.g., "find Movie XYZ," "show me Show ABC," etc.). After processing the voice command, the media player can cause the media presentation device to display search results, and the user can select a media-content item from the search results. Another example of a voice command is a playback-control command, such as "fast forward," "pause," "stop," or "resume." Still another example of a voice command is a channel launch command (e.g., "open Channel XYZ," "launch Channel RST," etc.). If the channel includes a profile selection screen, after launching, the channel presents the profile selection screen and prompts the user to select a user profile.

Further, some media presentation systems support direct playback of movies and TV shows through use of voice commands. For instance, when a movie or show is available exclusively on a particular streaming channel that does not utilize a profile selection screen, or a voice command specifically indicates a channel that does not utilize a profile selection screen and the movie or show, the media presentation system can respond to the voice command by beginning playback of the media-content item, rather than displaying search results. Unfortunately, however, with current solutions, direct playback of movies and TV shows through use of voice commands is currently limited to streaming channels that do not utilize profile selection screens.

In addition, in media presentation systems that provide advertisements, it is beneficial to know which of multiple users at a customer premises is using the media player. If a media presentation system can identify which of multiple users at a customer premises is using the media player when an advertisement is presented, the media presentation system can provide metadata (e.g., demographic data) for the identified user to a measurement platform, and the measurement platform can use the metadata to increase the value of the advertisement impression by associating metadata for the identified user with the advertisement impression.

Similarly, if the media presentation system can identify that a first user at a customer premises is using the media player at a first time a given advertisement is presented and that a second, different user is using the media player at a second time the given advertisement is presented, the measurement platform can generate impression data indicating that two unique impressions occurred (e.g., presentation of the given advertisement to a first unique user at the first time and presentation of the given advertisement to a second unique user at the second time). In other words, the ability to uniquely identify users within a household can allow the measurement platform to generate user-specific impression data as opposed to household-specific impression data merely indicating that the advertisement was presented twice at the household.

With current solutions, it is difficult to uniquely identify which user at a customer premises is using a media player. Further, even with channels that provide user selection screens, some users share the same user profile, thereby limiting the ability of the measurement platform to identify which user is using the media player.

Disclosed herein are methods and systems to address these and potentially other issues. In an example method, a media player of a media presentations system obtains an audio signal. The audio signal includes a voice command and is obtained using a microphone of the media presentation system. The media player then identifies which of multiple speakers of a household uttered the voice command using the audio signal and a speaker-identification model. The media player also performs an action corresponding to the voice command. Based on the identification of the speaker using the audio signal and the speaker-identification model, the media player selects a user profile associated with the identified speaker within a streaming channel so as to bypass a profile selection screen of the streaming channel.

As such, the method allows the media player to support direct playback of movies and TV shows through use of voice commands. For instance, the media player can respond to a voice command that represents a request to play media content available on a streaming channel by launching the streaming channel, selecting the user profile associated with the identified speaker, and presenting the media content.

In another example method, a media player of a media presentation system obtains an audio signal. The audio signal includes a voice command and is obtained using a microphone of the media presentation system. The media player then identifies which of multiple speakers of a household uttered the voice command using the audio signal and a speaker-identification model. After obtaining the audio signal, the media player presents an advertisement. The media player also obtains metadata for the identified speaker. Based on the identification of the speaker using the audio signal and the speaker-identification model, the media player generates an advertisement impression record that associates the metadata for the identified speaker with the advertisement.

As such, the method allows the media presentation system to generate user-specific impression data as opposed to household-specific impression data merely indicating that the advertisement was presented at the household.

II. Example Architecture

A. Media Presentation System

Figure 1:
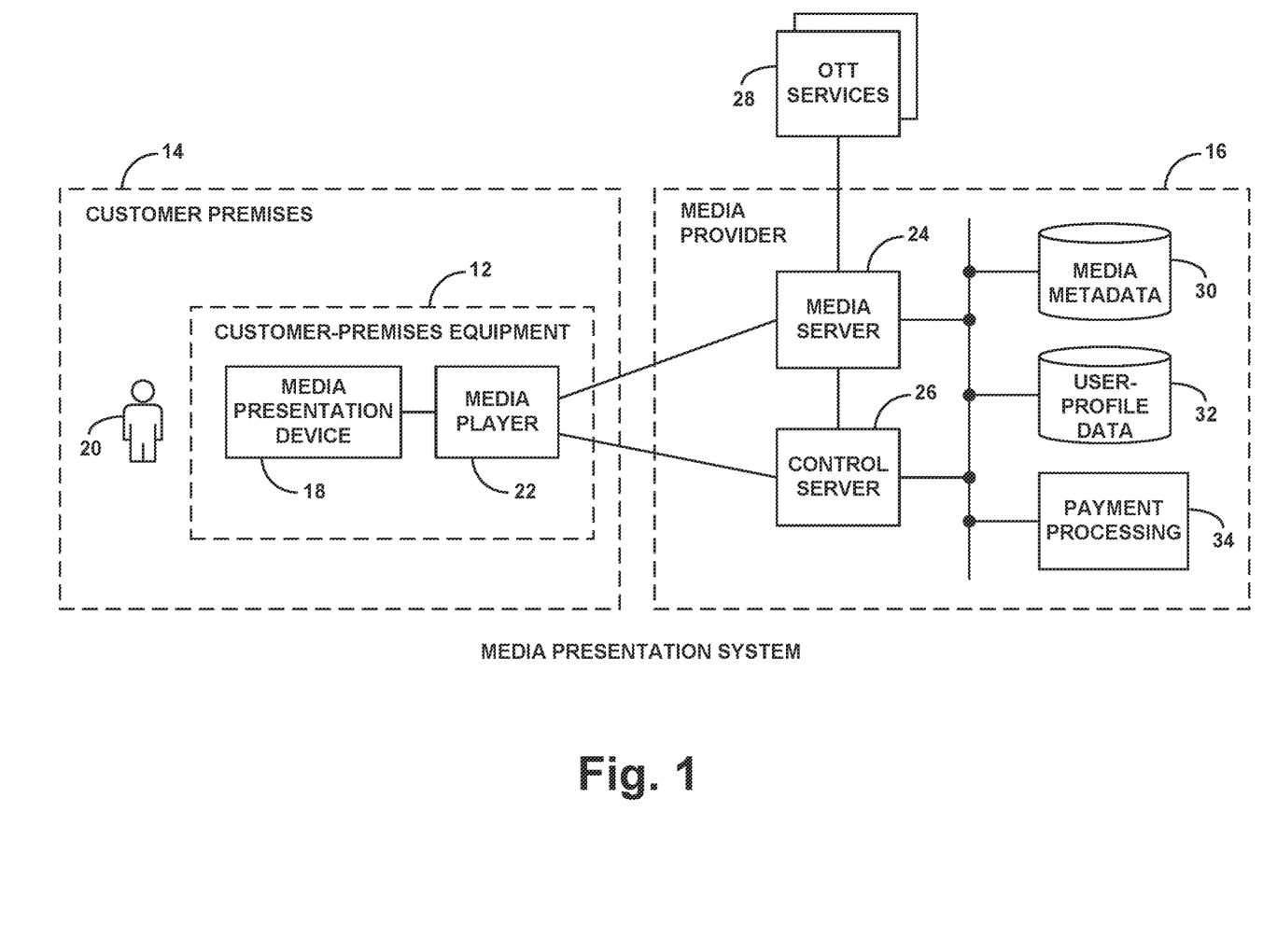
FIG. 1 is a simplified block diagram of an example media presentation system.

FIG. 1 is a simplified block diagram of an example media presentation system. FIG. 1 is a simplified block diagram of an example media presentation system. In line with the discussion above, the example media presentation system includes customer-premises equipment 12 located at customer premises 14 such as a home, and a network based media provider 16 configured to provide the customer-premises equipment 12 with media content for presentation.

In the example arrangement, the customer-premises equipment 12 includes a media presentation device 18 such as a TV or other user-interface device configured to present media content to one or more users such as example user 20. Further, the customer-premises equipment 12 includes a media player 22, such as an OTT device, configured to receive streaming media content and to provide the media content to the media presentation device 18 for presentation. In various implementations, the media player 22 could be provided as a standalone device connected with the media presentation device 18 by a High Definition Multimedia Interface (HDMI) cable or other wired or wireless connection. As one example, the media player 22 can be part of a soundbar. In other instances, the media player 22 could be integrated within the media presentation device 18. For instance, the customer-premises equipment 12 can include a television having an integrated media player. As another example, the customer-premises equipment 12 can include a smartphone having an integrated media player.

The example network-based media provider 16 then includes a media server 24 configured to stream media content to user devices such as customer-premises equipment 12 and includes a control server 26 configured to control the streaming. The media provider 16 could be configured to obtain much of this content on demand from various OTT services 28 and to serve or proxy that media content to the customer-premises equipment for presentation.

In an example implementation, the media player 22 could be in network communication with both the media server 24 and control server 26, to facilitate interacting with the media provider 16 to receive information about available media content, and to request and receive streaming media content for presentation on media presentation device 18. For instance, the media player 22 could have local area network (LAN) connectivity at the customer premises 14, the customer premises 14 could have a router and modem (not shown) with an assigned public Internet Protocol (IP) address on the Internet, and the media server 24 and control server 26 could be accessible at respective public IP addresses as well. Alternatively, the media player 22 could have virtual private network (VPN) connectivity with the media server 24 and control server 26, among other possibilities.

Streaming of media content from the media server 24 to the media player 22 could operate according to any of a variety of well-known adaptive bit-rate streaming protocols, such as Dynamic Adaptive Streaming over Hypertext Transfer Protocol (HTTP) (DASH), HTTP Live Streaming (HLS), or Smooth Streaming Transport Protocol (SSTP), among other possibilities. As the details of these streaming protocols are known, they will not be described here.

In the example implementation, the media provider 16 could include or otherwise have access to various data and platforms to facilitate providing streaming media services to users such as user 20. As shown, for instance, the media provider 16 could have access to media metadata 30, user profile data 32, and a payment processing system 34. The media metadata 30 could include a variety of information regarding each of various media-content items available for streaming, such title, duration, genre, production staff, menu graphics, and ratings, among other possibilities. The user profile data 32 could include profile records for users and associated customer-premises equipment configured to receive streaming media service provided by the media provider 16, such as user name, equipment location, user-payment information (e.g., credit card information), and mobile phone number if applicable. And the payment processing system 34 could be configured to securely interact with a commercial payment processing platform (e.g., a credit-card service) (not shown) and with a user such as user 20, to enable the media provider 16 to process user payments for media streaming and/or other services.

As noted above, the media presentation system could be configured to present the user 20 with an on-screen media-content selection menu, and the user could operate a remote control (not shown) to navigate through that menu and interact with various on-screen prompts in order to select a desired media-content item to be presented and to direct the system to present that selected item. In practice, for instance, the control server 26 could serve the media player 22 with graphical user interfaces (GUIs) representing various menu screens and prompts, and the media player 22 could responsively output the GUIs for presentation by the media presentation device 18. The control server 26 could establish these GUIs based on the media metadata 30 and user profile data 32, such as restricting the GUIs to present information about media content that is available for streaming to the user 20. And the control server 26 could receive user input entered into media player 22 and could respond to the user input by generating and transmitting other GUIs to the media player 22 for presentation.

B. Customer-Premises Equipment

Figure 2:
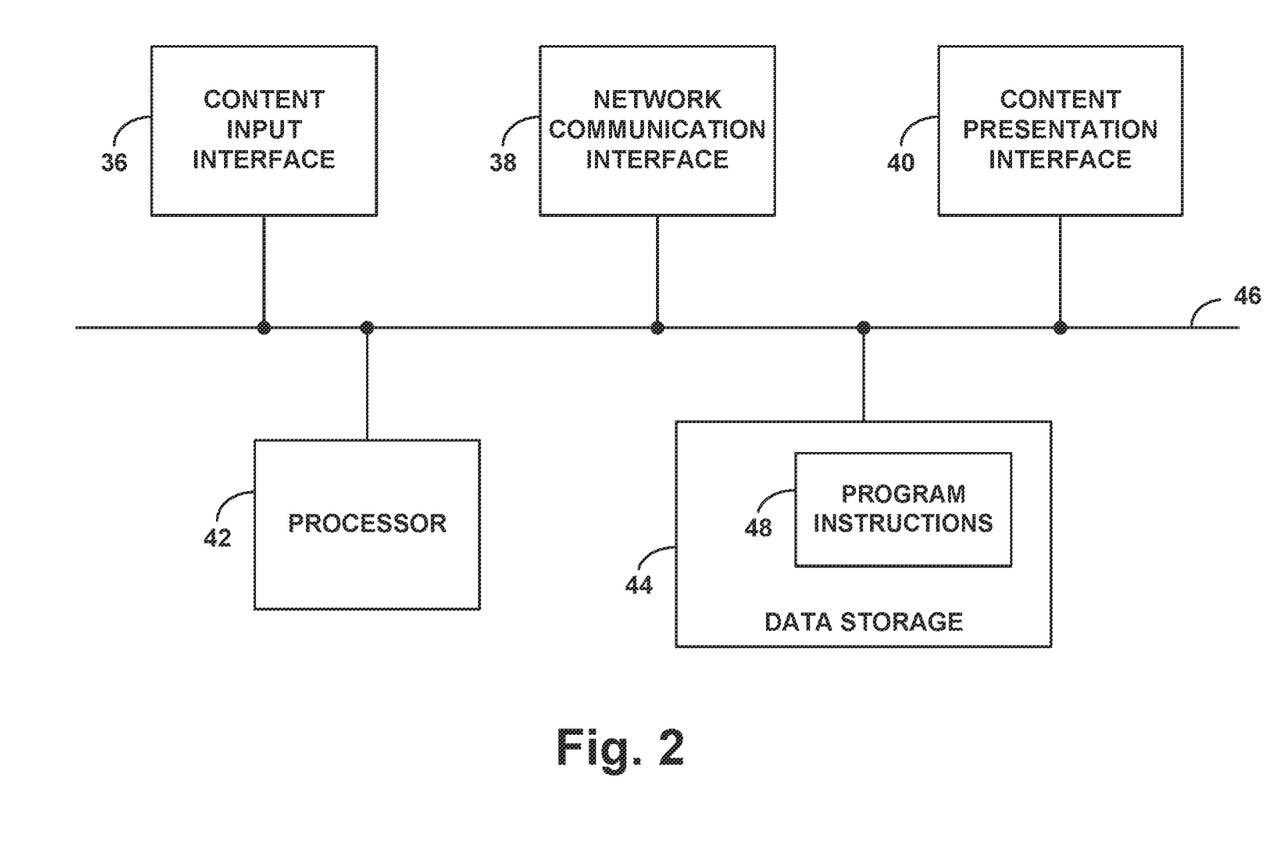
FIG. 2 is a simplified block diagram of example customer-premises equipment.

FIG. 2 is a simplified block diagram of example customer-premises equipment, including aspects of a media player and media presentation device as discussed above. As shown in FIG. 2, the example customer-premises equipment includes a content input interface 36, a network communication interface 38, a content presentation interface 40, a processor 42, and non-transitory data storage 44, any or all of which could be integrated together or, as shown, communicatively linked together by a system bus, network, or other connection mechanism 46.

Content input interface 36 could comprise a physical communication interface for receiving media content to be presented by the customer-premises equipment. As such, the content input interface 36 could include one or more wired and/or wireless interfaces for establishing communication with and receiving media content in analog or digital form from a media source. Network communication interface 38, which could be separate from or the same interface as the content input interface 36, could comprise a physical network connection mechanism to facilitate communication on a network, and/or for engaging in direct or networked communication with one or more other local or remote entities. These interfaces could comprise a wireless or wired Ethernet interface or other type of network interface, for engaging in IP communication and/or other type of network communication, among other possibilities.

Content presentation interface 40 could then comprise one or more components to facilitate presentation of the received media content. By way of example, the content presentation interface 40 could comprise a user interface such as a display screen and/or a loudspeaker, as well as one or more drivers or other components for processing the received media content to facilitate presentation of the content on the user interface.

Processor 42 could then comprise one or more general purpose processors (e.g., microprocessors) and/or one or more specialized processors (e.g., application specific integrated circuits). And non-transitory data storage 44 could comprise one or more volatile and/or non-volatile storage components, such as optical, magnetic, or flash storage. Further, as shown, non-transitory data storage 44 could store stores program instructions 48, which could be executable by processor 42 to carry out various operations described here.

C. Voice Input Processing Module

Figure 3:
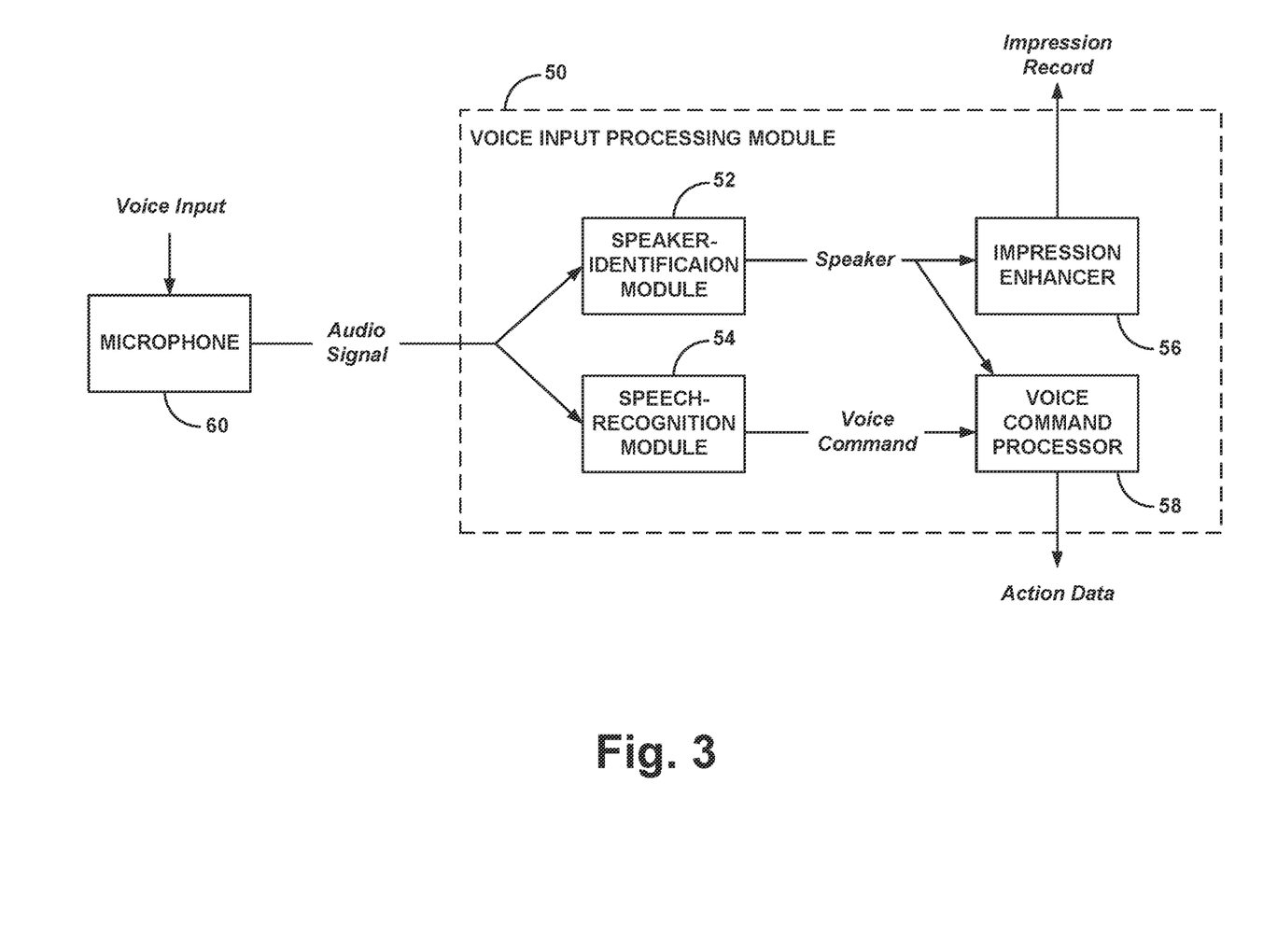
FIG. 3 is a simplified block diagram of an example voice input processing module.

FIG. 3 is a simplified block diagram of an example voice input processing module 50. Voice input processing module 50 can be part of the example customer-premises equipment of FIG. 2. For instance, voice input processing module 50 can be part of a media player or communicatively linked to a media player. As shown in FIG. 3, voice input processing module 50 includes a speaker-identification module 52, a speech-recognition module 54, an impression enhancer 56, and a voice command processor 58.

One or more of the modules depicted in FIG. 3 can be implemented using hardware (e.g., a processor of a machine such as processor 42 of FIG. 2 or a separate processor, a field-programmable gate array (FPGA), or an application-specific integrated circuit (ASIC), or a combination of hardware and software (e.g., program instructions 48 of FIG. 2). Moreover, any two or more of the modules depicted in FIG. 3 can be combined into a single module, and the function described herein for a single module can be subdivided among multiple modules.

Voice input processing module 50 can be configured to obtain an audio signal from a microphone 60 of a media presentation system. Microphone 60 can be included in various types of hardware, depending on the desired implementation. As an example, microphone 60 can be part of or coupled to a remote control that is configured to control a media player of the customer-premises equipment. As another example, microphone 60 can be part of or coupled to the media player. As still another example, microphone 60 can be part of or coupled to a media-presentation device of the customer-premises equipment. As still another example, microphone 60 can be part of or coupled to a mobile device (e.g., a smartphone). The mobile device can provide an application for interacting with the media player. As yet another example, microphone 60 can be part of a loudspeaker, such as a soundbar, smart speaker, etc. As yet another example, microphone 60 can be part of an audio/video receiver.

The audio signal can be a representation of a voice command. For instance, the audio signal can be a representation of a voice search, a playback-control command, a channel launch command, a device test command, etc. In some instances, the audio signal can include a wake word/phrase (e.g., "Hey Roku"). Microphone 60 can provide the audio signal to voice input processing module 50 via a wired and/or wireless communication link.

Speaker-identification module 52 can be configured to identify which of multiple speakers of a household uttered a voice command using the audio signal and a speaker-identification model. By way of example, speaker-identification module 52 can extract a query fingerprint from the audio signal using the speaker-identification model, and identify the speaker by comparing the query fingerprint against multiple reference fingerprints corresponding to respective speakers of a household. For instance, when given features of the audio signal as input, speaker-identification module 52 can provide the features as input to a speaker-identification model, and the speaker-identification model can encode the features into a number so as to create a fingerprint. In some instances, the query fingerprint is an n-dimensional query vector, and speaker-identification module 52 compares the query fingerprint against multiple reference fingerprints by determining which of multiple n-dimensional reference vectors is nearest to the n-dimensional query vector. Speaker-identification module 52 can output an indication of the speaker to impression enhancer 56 and/or voice command processor 58. The indication can include a name (e.g., a name specified by a speaker during configuration) or number (e.g., an integer), for instance.

In some examples, speaker-identification module 52 trains the speaker-identification model using training data. For instance, the training data can include audio signals that are labeled as uttered by respective speakers of a household. The training data can be gathered by prompting respective users to identify themselves (e.g., by name or number) and speak a few voice commands. In some instances, additional training data can be gathered by prompting a speaker to confirm that an identification determined by speaker-identification module 52 during use of the customer-premises equipment is correct and/or to associate the identification with an existing or new speaker of the household.

Training the speaker-identification model can involve causing the speaker-identification module 52 to learn weights (e.g., weights of a neural network) that minimize a loss function. The loss function can encourage the speaker-identification model to cluster unique speakers tightly together and to keep different speakers spaced apart.

Speech-recognition module 54 can be configured to analyze the received audio signal to recognize voice commands using any well-known speech recognition techniques, procedures, technologies, etc. For instance, speech-recognition module 54 can be configured to translate the audio signal into text. In some examples, speech-recognition module 54 uses a Hidden Markov model. In other examples, speech-recognition module 54 uses a recurrent neural network (RNN), such as a long short-term memory (LSTM) RNN. Speech-recognition module 54 can output recognized voice commands to voice command processor 58.

Impression enhancer 56 can be configured to receive the indication of an identified speaker, and generate an impression record that associates metadata for the identified speaker with an advertisement presented by a media presentation device of the customer-premises equipment. As one example, the metadata can be an integer assigned to the identified speaker. For instance, impression enhancer 56 can store data that associates an integer with each of multiple respective speakers of a household. As another example, the metadata can be demographic data, such as age and/or gender. Impression enhancer 56 can obtain the metadata by requesting such information from various users in a household (e.g., during configuration of the customer-premises equipment), and storing the metadata in a database. Impression enhancer 56 can use the indication of the identified speaker to retrieve corresponding metadata from the database.

The advertisement with which impression enhancer 56 associates the metadata for the identified speaker can be an advertisement recently presented by the media presentation device before the identification of the speaker (e.g., within a threshold time, such as two minutes, of a time that the speaker provided the voice input) or an advertisement subsequently presented by the media presentation device, such as an advertisement presented shortly after (e.g., within two minutes of) the identification of the speaker. For instance, the advertisement can be a video advertisement presented between content segments of a television show or movie. Alternatively, the advertisement can be an interstitial advertisement or banner advertisement displayed by the media presentation device (e.g., within a media-content selection menu, prior to presentation of media content, or during presentation of media content).

In some instances, impression enhancer 56 transmits the impression record to a measurement platform that is configured to measure (e.g., count) advertisement impressions using impression beacons. Impression beacons are notifications indicating that an advertisement has been presented.

One example of an impression beacon is a Hypertext Transfer Protocol (HTTP) request. In some instances, a tracking module implemented by a media player can transmit impression beacons to a measurement platform when trigger conditions are satisfied. For example, the media player can transmit an impression beacon when a first frame of an advertisement is displayed. Additionally or alternatively, the media player can transmit impression beacons at specific increments throughout a duration of an advertisement, such that the measurement platform can track how long the media player presents the advertisement.

The impression record transmitted by impression enhancer 56 can include data that allows the measurement platform to match or correlate the impression record with one or more received impression beacons. Such data can include a timestamp, device identifier (e.g., an advertising identifier) of a media player, and/or user ID of a logged-in user, for instance. The measurement platform can associate the metadata for the identified speaker with one or more impression beacons using such data.

Voice command processor 58 can be configured to receive a voice command and determine action data using the voice command. For instance, voice command processor 58 can store correlation data that maps voice command to action data, and voice command processor 58 can use the correlation data to map the voice command to respective action data. The action data can include an instruction that causes the media player to carry out a responsive action. For instance, the action data can include a voice search (e.g., find show A), a playback-control action (e.g., pause, skip, fast forward, rewind, turn on closed captioning, select, etc.), a channel launch action (e.g., launch channel A), a direct playback action (e.g., play media content A, or play media content B on channel C), a device test action, etc.

Additionally, in some instances, voice command processor 58 is configured to receive an indication of an identified speaker. Voice command processor 58 can use the indication of the identified speaker to generate the action data. For instance, based on determining that the voice command is a channel launch action or a direct playback action, voice command processor 58 can include the indication of the identified speaker within the action data. With this approach, the media player can then use the action data to bypass a profile selection screen. For instance, when the voice command is a channel launch command for a channel that includes a profile selection screen, or the voice command is a voice search (e.g., play media content A) and the identified media content is available on channel that includes a profile selection screen, the action data can cause the media player to bypass the profile selection screen after the media player launches the channel.

D. Speaker-Identification Module

Figure 4:
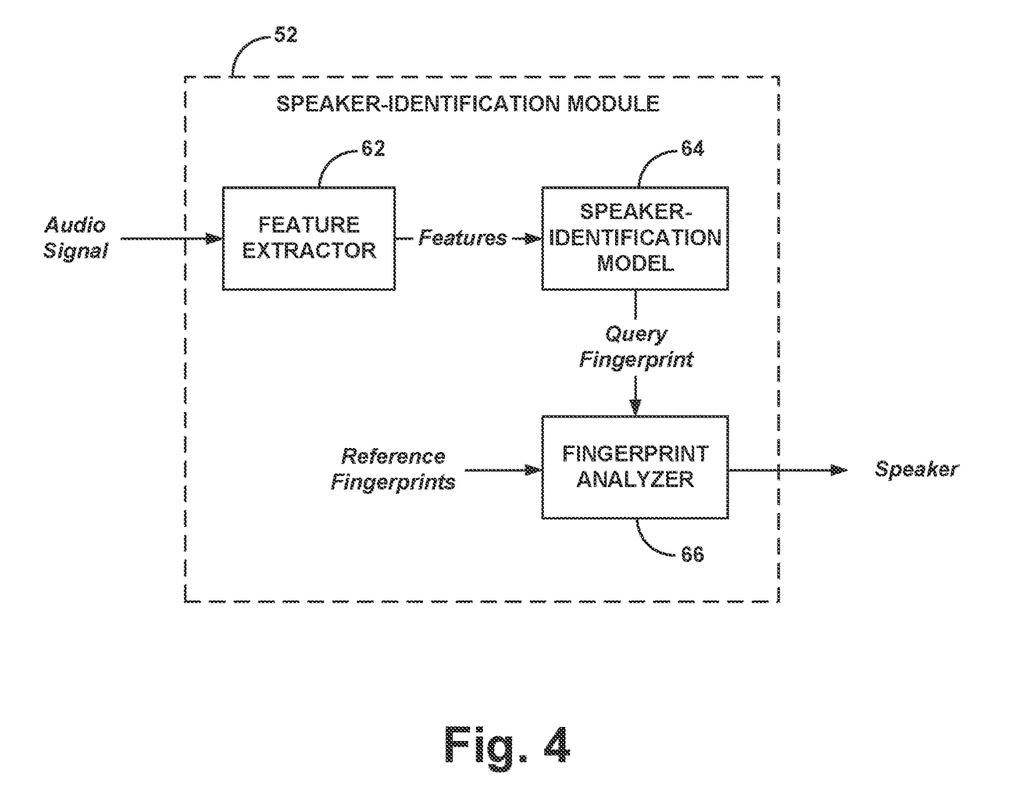
FIG. 4 is a simplified block diagram of an example speaker-identification module.

FIG. 4 is a simplified block diagram of an example speaker-identification module. The speaker-identification module shown in FIG. 4 is an example implementation of speaker-identification module 52 of FIG. 3. However, the example is not meant to be limiting. Speaker-identification module 52 can be implemented in other ways with modifications as appropriate for the desired implementation.

As shown in FIG. 4, speaker-identification module 52 includes a feature extractor 62, a speaker-identification model 64, and a fingerprint analyzer 66. One or more of the modules depicted in FIG. 4 can be implemented using hardware (e.g., a processor of a machine such as processor 42 of FIG. 2 or a separate processor, a field-programmable gate array (FPGA), or an application-specific integrated circuit (ASIC), or a combination of hardware and software (e.g., program instructions 48 of FIG. 2). Moreover, any two or more of the modules depicted in FIG. 4 can be combined into a single module, and the function described herein for a single module can be subdivided among multiple modules.

Feature extractor 62 can be configured to receive an audio signal, and extract features from the audio signal for use as input to speaker-identification model 64. The features can include time domain features, frequency range features, among other possible features. For instance, the features can include spectrograms (e.g., mel-spectrograms and/or constant-Q transform spectrograms), chromagrams, and/or mel-frequency cepstral coefficients (MFCCs). In some instances, feature extractor 62 can use a sliding window filter to extract features for multiple segments of a sample of the audio signal. By way of example, the audio signal may be a three-second sample. Feature extractor 62 can generate nine different segments by sliding a one-second window over the three-second sample using a hop size of one-quarter of a second. Further, feature extractor 62 can then extractor features for each of the different segments, so as to extractor nine sets of features.

Speaker-identification model 64 can have any of a variety of different configurations. As one example, speaker-identification model 64 can be a convolutional neural network having five or six depth-wise separable layers. Speaker-identification model 64 can receive features output by feature extractor 62, and generate a query fingerprint. The query fingerprint can include an n-dimensional query vector (e.g., a 128-dimension vector, a 256-dimension vector, etc.). As other examples, speaker-identification model 64 can be an RNN (e.g., a LSTM RNN) model or a gated recurrent unit (GRU) model. As yet another example, speaker-identification model 64 can included a hybrid GRU and CNN model. Speaker-identification model 64 can store the generated query fingerprint for subsequent analysis by fingerprint analyzer 66.

Fingerprint analyzer 66 can be configured to receive one or more query fingerprints, and identify a speaker by comparing the query fingerprint against multiple reference fingerprints. For instance, fingerprint analyzer 66 can determine which of multiple reference fingerprints is nearest to a query fingerprint. Alternatively, fingerprint analyzer 66 can determine that a similarity between the query fingerprint and at least one reference fingerprint satisfies a predetermined threshold (e.g., a Euclidean distance threshold). After identifying a speaker, fingerprint analyzer 66 can output an indication of the identified speaker.

In some instances, speaker-identification model 64 is configured to receive multiple sets of features corresponding to a given sample of an audio signal, and generate respective query fingerprints for each of the sets of features. Further, fingerprint analyzer 66 is configured to identify a speaker by combining the query fingerprints (e.g., averaging), and to compare the resulting combination against the reference fingerprints.

The reference fingerprints can also be generated using feature extractor 62 and speaker-identification model 64. For instance, speaker-identification module 52 can receive five samples of audio signals that are known to correspond to a given speaker. Speaker-identification module 52 can be configured to generate a fingerprint for each respective sample. Further, speaker-identification module 52 can combine (e.g., average) the five samples so as to generate a reference fingerprint for the speaker. Similarly, speaker-identification module 52 can be configured to generate reference fingerprints for other speakers within a household using other audio samples.

III. Example Operations

The customer-premises equipment of FIG. 2 and/or components thereof can perform various acts and/or functions. Examples of these and related features will now be described.

A. Obtaining an Audio Signal

In line with the discussion above, a media player of customer-premises equipment can receive an audio signal from a microphone of a media presentation system. The audio signal can be a representation of a voice command, such as a voice search, playback-control command, channel launch command, or device test command. The microphone can be part of or coupled to a remote control, the media player, or a media-presentation device of the customer-premises equipment. Alternatively, the microphone can be part of or coupled to a smartphone, a loudspeaker, or an audio/video receiver.

In some examples, the microphone can transmit the audio signal to the media player in response to determining that a microphone has been activated. For instance, a user can activate the microphone by pressing or otherwise selecting a microphone button/icon, the microphone or a device coupled to which the microphone is coupled can detect the pressing of the button/icon, and responsively forward an audio signal obtained by the microphone after the pressing of the button/icon to the media player. Alternatively, the microphone can continually forward audio signals to the media player, and the media player can process the audio signal in search of a wake word/phrase. After detecting a wake word/phrase, the media player can then isolate a portion of the audio signal occurring after the wake word/phrase for further processing.

B. Identifying a Speaker

In line with the discussion above, a speaker-identification module of the media player can identify which of multiple speakers of a household uttered a voice command using one or more audio signals obtained by the media player. For instance, the speaker-identification module can extract a query fingerprint from an audio signal, and compare the query fingerprint with reference fingerprints corresponding to respective speakers of the household.

In some examples, the distance between a query fingerprint and a reference fingerprint for a given speaker is indicative of a likelihood that that the given speaker uttered the voice command. The distance can be inversely proportional to the likelihood. Accordingly, the speaker-identification module can interpret a first, lesser distance between the query fingerprint and a first reference fingerprint as a first likelihood, and interpret a second, greater distance between the query fingerprint and a second reference fingerprint as a second likelihood, with the first likelihood being greater than the second likelihood.

In some examples, the speaker-identification module outputs an indication of the identified speaker based on determining that a distance to a nearest reference fingerprint satisfies a threshold condition. For instance, the speaker-identification module can compare the distance to a distance threshold. Based on determining that the distance is less than the distance threshold, the speaker-identification module can output an indication that the speaker is a speaker corresponding to the nearest reference fingerprint. Whereas, based on determining that the distance is more than the distance threshold, the speaker-identification module forgoes classifying the speaker or prompts the user of the media player to confirm that the speaker is the speaker corresponding to the nearest reference fingerprint. The distance threshold can be a function of an average distance between reference fingerprints (e.g., ⅓ of the average distance).

C. Bypassing a Profile Selection Screen

When launching a streaming channel in response to a detected voice command, the media player can use an indication of an identified speaker to bypass a profile selection screen of a streaming channel. By way of example, prior to or while launching the streaming channel related to the voice command, the media player can obtain an indication of an identified speaker. Further, the media player can then use correlation data to determine a user profile associated with the identified speaker. And the media player can provide data indicative of a selection of the user profile to the streaming channel, such that the streaming channel can playback media content or provide a menu of media content items without displaying and prompting the user to select a user profile.

The media player can generate such correlation data during configuration of the media player and/or the streaming channel. For instance, for one or more streaming channels, the media player can obtain from a user data linking a given speaker of a household to a given user profile within a streaming channel. When launching a streaming channel in response to a voice command uttered by an identified speaker, based on determining that the correlation data includes data linking the identified speaker to a user profile for the streaming channel, the media player can select the user profile so as to bypass a profile selection screen for the streaming channel.

As an example, a household may include two known speakers, and correlation data linking a first speaker with a first user profile of a first streaming channel as well as correlation data linking a second speaker with a second user profile of the first streaming channel. The first speaker may utter a voice search command such as "Play Show A on the first streaming channel." Based on identifying that the first speaker uttered the voice command, the media player can determine that the correlation data links the first speaker with the first user profile. Accordingly, the media player can launch the streaming channel, select the first user profile, and being playback of Show A without any further input from the first speaker. In this manner, the first speaker can cause direct playback of Show A in a quick, efficient, and seamless manner.

D. Generating an Advertisement Impression Record

Additionally or alternatively, the media player can use an indication of an identified speaker to enhance impression records. By way of example, after receiving an indication of an identified speaker, the media player can obtain metadata for the identified speaker. Further, the media player can generate an advertisement impression record that associates the metadata with an advertisement presented by the media player.

In line with the discussion above, the metadata can include an integer or other identifier assigned to the identified speaker and/or demographic data corresponding to the identified speaker. The advertisement impression record can include data that allows a measurement platform to match or correlate the impression record with one or more received impression beacons. The media player can transmit the advertisement impression record to a measurement platform. The measurement platform can then associate the metadata for the identified speaker with one or more impression beacons.

As a particular example, the media player can receive a voice command and obtain an indication of an identified speaker. The media player can then cause a media-presentation device to present a menu that includes an advertisement. Based on determining that the media-presentation device presented the advertisement, the media player can generate an advertisement impression record that associates metadata for the identified speaker with the advertisement, and transmit the advertisement impression record to a measurement platform. Alternatively, the media player can store the advertisement impression record in a log, and subsequently transmit the log to a measurement platform at a later time. After obtaining the advertisement impression record, the measurement platform can associate the metadata for the identified speaker with one or more impression beacons.

As another example, the media player can receive a voice command and, based on receiving the voice command, launch a streaming channel. Further, the media player can obtain an indication of an identified speaker of the voice command. Prior to or after presenting part of a media content item via the streaming channel, the media player can present an advertisement (e.g., a thirty-second video). Based on presenting the advertisement, the media player can generate an advertisement impression record that associates metadata for the identified speaker with the advertisement.

Subsequently, the media player can receive another voice command determine that another, different speaker uttered the voice command. After receiving the other voice command, the media player can present the same advertisement again. Based on presenting the advertisement the second time, the media player can generate a second advertisement impression record that associates metadata for the identified speaker with the second presentation of the advertisement. After obtaining the advertisement impression records, a measurement platform can use the advertisement impression records to generate user-specific impression data indicating that the advertisement was presented to two different users.

E. First Example Method

Figure 5:
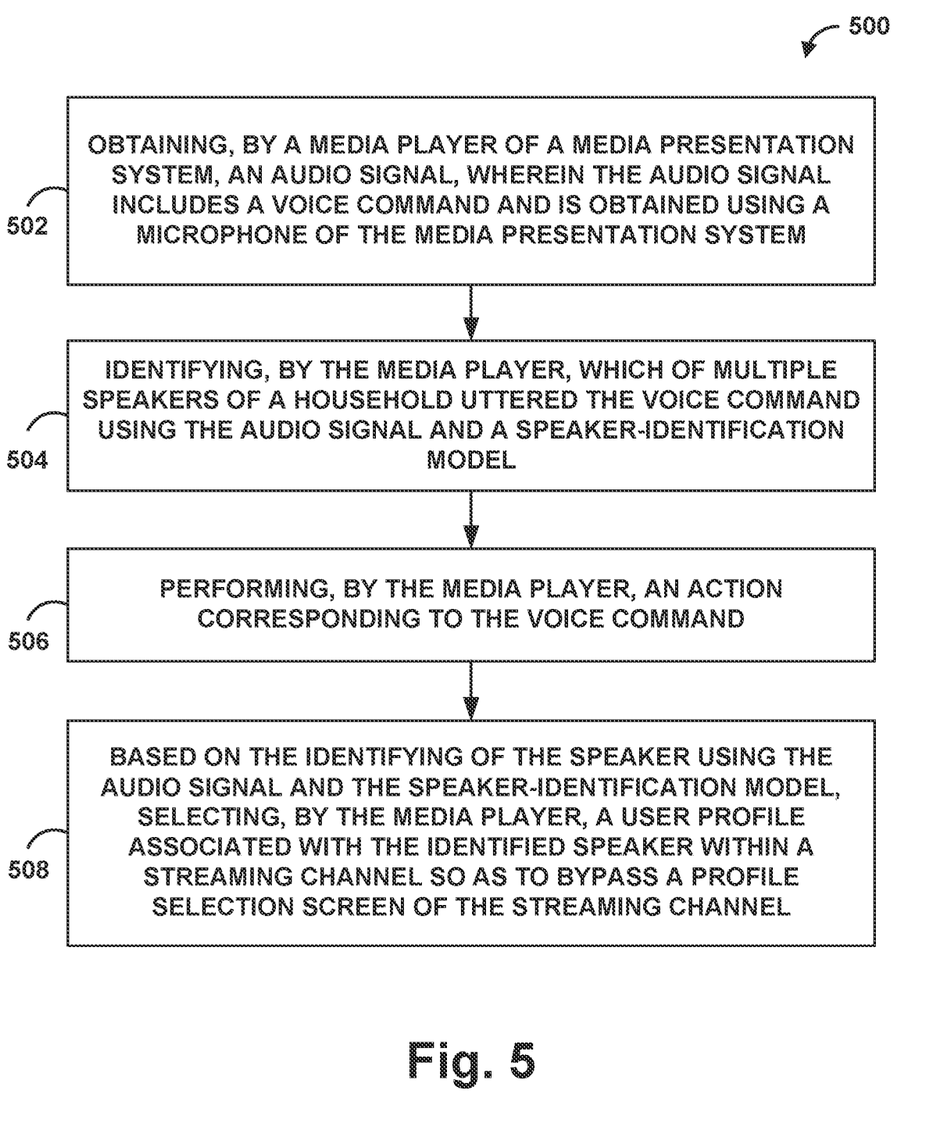
FIG. 5 is a flow chart of an example method.

FIG. 5 is a flow chart illustrating an example method 500. At block 502, the method 500 can include obtaining, by a media player of a media presentation system, an audio single, with the audio signal being a representation of a voice command obtained using a microphone of the media presentation system. At block 504, the method 500 can include identifying, by the media player, which of multiple speakers of a household uttered the voice command using the audio signal and a speaker-identification model. At block 506, the method 500 can include performing, by the media player, an action corresponding to the voice command. And at block 508, the method 500 can include based on the identifying of the speaker using the audio signal and the speaker identification model, selecting, by the media player, a user profile associated with the identified speaker within a streaming channel so as to bypass a profile selection screen of the streaming channel.

F. Second Example Method

Figure 6:
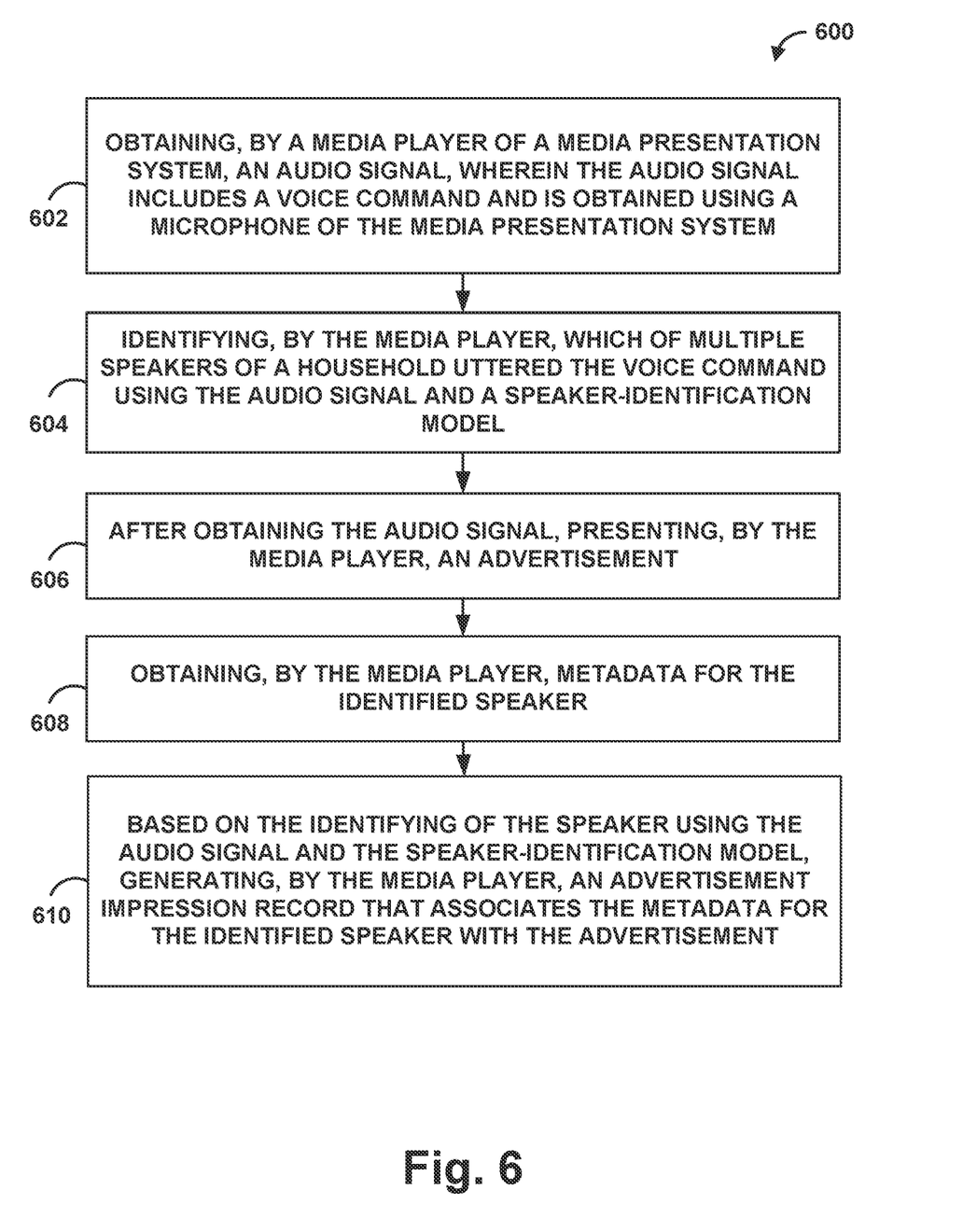
FIG. 6 is a flow chart of another example method.

FIG. 6 is a flow chart illustrating an example method 600. At block 602, the method 600 can include obtaining, by a media player of a media presentation system, an audio single, with the audio signal being a representation of a voice command obtained using a microphone of the media presentation system. At block 604, the method 600 can include identifying, by the media player, which of multiple speakers of a household uttered the voice command using the audio signal and a speaker-identification model. At block 606, the method 600 can include presenting, by the media player, an advertisement after obtaining the audio signal. At block 608, the method 600 can include obtaining, by the media player, metadata for the identified speaker. And at block 610, the method 600 can include based on the identifying of the speaker using the audio signal and the speaker-identification model, generating, by the media player, an advertisement impression record that associates the metadata for the identified speaker with the advertisement.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A media presentation system configured for performing a set of acts comprising:
    presenting an advertisement;
    obtaining an audio signal, wherein the audio signal comprises a voice command and is obtained using a microphone of the media presentation system;
    after presenting the advertisement, identifying, using the audio signal and a speaker-identification model, which of multiple speakers of a household uttered the voice command;
    obtaining metadata for the identified speaker; and
    based on the identifying of the speaker using the audio signal and the speaker-identification model, generating an advertisement impression record that associates the metadata for the identified speaker with the advertisement;
    obtaining another audio signal, wherein the other audio signal comprises another voice command;
    determining, using the other audio signal and the speaker-identification model, that another speaker of the multiple speakers of the household uttered the voice command;
    after obtaining the other audio signal, presenting the advertisement again; and
    obtaining metadata for the other identified speaker; and
    generating another advertisement impression record that associates the metadata for the other identified speaker with the additional presentation of the advertisement.

2. The media presentation system of claim 1, wherein the other voice command comprises a request to launch a streaming channel, a request to play media content, or a playback-control command.

3. The media presentation system of claim 1, wherein identifying which of the multiple speakers of the household uttered the voice command comprises:
- extracting a query fingerprint from the audio signal using the speaker-identification model; and
- identifying the speaker by comparing the query fingerprint against multiple reference fingerprints corresponding to respective speakers of the multiple speakers of the household.

4. The media presentation system of claim 3, wherein:
- the query fingerprint comprises an n-dimensional query vector,
- the multiple reference fingerprints comprises n-dimensional reference vectors, and
- comparing the query fingerprint against the multiple reference fingerprints comprises determining which of the n-dimensional reference vectors is nearest to the n-dimensional query vector.

5. The media presentation system of claim 1, the set of acts further comprising:
- performing an action corresponding to the voice command; and
- based on the identifying of the speaker using the audio signal and the speaker-identification model, selecting a user profile associated with the identified speaker within a streaming channel, wherein the streaming channel is configured by default to provide the profile selection screen after the streaming channel has been launched, and wherein selecting the user profile associated with the identified speaker within the streaming channel causes the media presentation system to provide data indicative of the selection of the user profile to the streaming channel so as to instead bypass the profile selection screen of the streaming channel after the media presentation system launches the streaming channel.

6. The media presentation system of claim 5, wherein:
- the voice command comprises a request to launch the streaming channel, and
- performing the action comprises launching the streaming channel.

7. The media presentation system of claim 5, wherein:
- the voice command comprises a request to play media content that is available on the streaming channel, and
- performing the action comprises launching the streaming channel and presenting the media content.

8. The media presentation system of claim 1, the set of acts further comprising:
- obtaining training data comprising audio signals labeled as uttered by respective speakers of the multiple speakers of the household; and
- training the speaker-identification model using the training data;
- presenting an advertisement;
- obtaining an audio signal, wherein the audio signal comprises a voice command;
- after presenting the advertisement, identifying, using the audio signal and a speaker-identification model, which of multiple speakers of a household uttered the voice command;
- obtaining metadata for the identified speaker; and
- based on the identifying of the speaker using the audio signal and the speaker-identification model, generating an advertisement impression record that associates the metadata for the identified speaker with the advertisement.

9. A method performed by a media presentation system, the method comprising:
- presenting an advertisement;
- obtaining an audio signal, wherein the audio signal comprises a voice command and is obtained using a microphone of the media presentation system;
- after presenting the advertisement, identifying, using the audio signal and a speaker-identification model, which of multiple speakers of a household uttered the voice command;
- obtaining metadata for the identified speaker;
- based on the identifying of the speaker using the audio signal and the speaker-identification model, generating an advertisement impression record that associates the metadata for the identified speaker with the advertisement;
- obtaining another audio signal, wherein the other audio signal comprises another voice command;
- determining, using the other audio signal and the speaker-identification model, that another speaker of the multiple speakers of the household uttered the voice command;
- after obtaining the other audio signal, presenting the advertisement again; and
- obtaining metadata for the other identified speaker; and generating another advertisement impression record that associates the metadata for the other identified speaker with the additional presentation of the advertisement.

10. The method of claim 9, wherein the other voice command comprises a request to launch a streaming channel, a request to play media content, or a playback-control command.

11. The method of claim 9, wherein identifying which of the multiple speakers of the household uttered the voice command comprises:
- extracting a query fingerprint from the audio signal using the speaker-identification model; and
- identifying the speaker by comparing the query fingerprint against multiple reference fingerprints corresponding to respective speakers of the multiple speakers of the household.

12. The method of claim 11, wherein:
- the query fingerprint comprises an n-dimensional query vector,
- the multiple reference fingerprints comprises n-dimensional reference vectors, and
- comparing the query fingerprint against the multiple reference fingerprints comprises determining which of the n-dimensional reference vectors is nearest to the n-dimensional query vector.

13. The method of claim 9, further comprising:
- performing an action corresponding to the voice command; and
- based on the identifying of the speaker using the audio signal and the speaker-identification model, selecting a user profile associated with the identified speaker within a streaming channel, wherein the streaming channel is configured by default to provide the profile selection screen after the streaming channel has been launched, and wherein selecting the user profile associated with the identified speaker within the streaming channel causes the media presentation system to provide data indicative of the selection of the user profile to the streaming channel so as to instead bypass the profile selection screen of the streaming channel after the media presentation system launches the streaming channel.

14. The method of claim 13, wherein:
the voice command comprises a request to launch the streaming channel, and
performing the action comprises launching the streaming channel.

15. The method of claim 13, wherein:
the voice command comprises a request to play media content that is available on the streaming channel, and
performing the action comprises launching the streaming channel and presenting the media content.

16. The method of claim 9, further comprising:
obtaining training data comprising audio signals labeled as uttered by respective speakers of the multiple speakers of the household; and
training the speaker-identification model using the training data.

17. A non-transitory computer-readable storage medium having stored thereon program instruction that when executed by a processor cause a computing system to perform a set of acts comprising:
presenting an advertisement;
obtaining an audio signal, wherein the audio signal comprises a voice command and is obtained using a microphone;
after presenting the advertisement, identifying, using the audio signal and a speaker-identification model, which of multiple speakers of a household uttered the voice command;
obtaining metadata for the identified speaker;
based on the identifying of the speaker using the audio signal and the speaker-identification model, generating an advertisement impression record that associates the metadata for the identified speaker with the advertisement;
obtaining another audio signal, wherein the other audio signal comprises another voice command;
determining, using the other audio signal and the speaker-identification model, that another speaker of the multiple speakers of the household uttered the voice command;
after obtaining the other audio signal, presenting the advertisement again; and
obtaining metadata for the other identified speaker; and generating another advertisement impression record that associates the metadata for the other identified speaker with the additional presentation of the advertisement.

* * * * *